(12) United States Patent
Detwiler et al.

(10) Patent No.: US 11,061,226 B2
(45) Date of Patent: Jul. 13, 2021

(54) CONTROL OF ELECTROCHROMIC PIXELS USING INTEGRATED TRANSPARENT PHOTOVOLTAIC CONVERTERS AND PROJECTED LIGHT FOR A TRANSPARENT WINDOW DISPLAY

(71) Applicant: Honda Motor Co., Ltd., Tokyo (JP)

(72) Inventors: Duane Trent Detwiler, Powell, OH (US); Nichole A. Verwys, Marysville, OH (US); Joan R. Smith, Plain City, OH (US); Carter Hurd, Powell, OH (US); Erin Clepper, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 427 days.

(21) Appl. No.: 15/898,899

(22) Filed: Feb. 19, 2018

(65) Prior Publication Data
US 2019/0258055 A1  Aug. 22, 2019

(51) Int. Cl.
*G02B 27/01* (2006.01)
*G02F 1/15* (2019.01)
(Continued)

(52) U.S. Cl.
CPC ........... *G02B 27/01* (2013.01); *G02F 1/1503* (2019.01); *G02F 1/163* (2013.01); *G02F 1/167* (2013.01)

(58) Field of Classification Search
CPC .......... G02F 1/163; G02F 1/155; G02F 1/153; G02F 1/1523; G02F 1/1533; G02F 1/15; G02F 1/157; G02F 1/161; G02F 1/15165; G02F 1/1508; G02F 1/13318; G02F 1/1503; G02F 2001/1555; G02F 2001/15145; G02F 2001/164; G02F 2201/44; G02F 2203/11; G02F 1/0018; G02F 1/1525; G02F 2001/1536; G02F 1/0126; G02F 1/0147; G02F 2202/14; G02F 2202/36;
(Continued)

(56) References Cited

U.S. PATENT DOCUMENTS 4,053,209 A   10/1977  Hara et al.
4,277,145 A   7/1981  Hareng et al.
(Continued)

OTHER PUBLICATIONS

International Search Report and Written Opinion of PCT/US2018/059376 dated Jan. 24, 2019, 14 pages.

*Primary Examiner* — Collin X Beatty
*Assistant Examiner* — Grant A Gagnon
(74) *Attorney, Agent, or Firm* — Rankin, Hill & Clark LLP

(57) ABSTRACT

A vehicle head up display system includes a transparent window assembly and an ultraviolet or infrared light source. The light source is used to irradiate transparent photovoltaic converters in the window assembly so that the photovoltaic converters produce an electric current. The electric current is transmitted to electrochromic pixels in the window assembly and actuates the electrochromic pixels in the window assembly to switch between having a transparent appearance and having an opaque appearance. Visual contrast between transparent pixels and opaque pixels provide indicia on the window assembly. The indicia can be removed from the window assembly by actuating the opaque pixels to have the transparent appearance by a subsequent application of electric current exceeding the threshold voltage. An electronic control unit can be including in the system for controlling operation of the light source.

20 Claims, 2 Drawing Sheets

(51) Int. Cl.
*G02F 1/163* (2006.01)
*G02F 1/167* (2019.01)
*G02F 1/1503* (2019.01)

(58) Field of Classification Search
CPC .............. G02F 2203/01; G02F 1/0121; G02F 1/133602; G02F 1/133603; G02F 1/1347; G02F 2001/1502; G02F 1/13306; G02F 1/133308; G02F 1/13336; G02F 1/13439; G02F 1/13458; G02F 1/1506; G02F 1/1676; G02F 1/17; G02F 2001/133626; G02F 2001/1518; G02F 2201/123; G02F 2201/38; G02F 2201/58; G02F 1/01; G02F 1/0102; G02F 1/0107; G02F 1/0128; G02F 1/1309; G02F 1/1313; G02F 1/1323; G02F 1/133305; G02F 1/13338; G02F 1/1334; G02F 1/133512; G02F 1/133514; G02F 1/133516; G02F 1/133528; G02F 1/133615; G02F 1/1339; G02F 1/1345; G02F 1/137; G02F 1/13737; G02F 1/167; G02F 1/19; G02F 2001/13312; G02F 2001/13324; G02F 2001/134345; G02F 2001/1635; G02F 2201/083; G02F 2201/086; G02F 2201/122; G02F 2201/16; G02F 2201/50; G02F 2201/508; G02F 2202/00; G02F 2202/02; G02F 2202/023; G02F 2202/28; G02F 2203/02; G02F 2203/055; G02F 2203/10; G02F 2203/62; B64C 1/1492; B64C 1/1484; B64C 1/14
USPC ........................................................ 359/275
See application file for complete search history.

(56) References Cited

U.S. PATENT DOCUMENTS

| | | |
|---|---|---|
| 4,481,510 A | 11/1984 | Hareng et al. |
| 6,373,618 B1 | 4/2002 | Agrawal et al. |
| 6,441,942 B1 | 8/2002 | Branz et al. |
| 6,535,126 B2 | 3/2003 | Lin et al. |
| 6,864,927 B1 | 3/2005 | Cathey |
| 6,900,916 B2 | 5/2005 | Okazaki et al. |
| 7,009,179 B2 | 3/2006 | Nihei |
| 7,116,309 B1 | 10/2006 | Kimura et al. |
| 2005/0137542 A1 | 6/2005 | Underhill et al. |
| 2007/0115399 A1 | 5/2007 | Brabec et al. |
| 2009/0181203 A1 | 7/2009 | Valentin et al. |
| 2011/0061708 A1 | 3/2011 | Huang |
| 2011/0214082 A1 | 9/2011 | Osterhout et al. |
| 2012/0186623 A1 | 7/2012 | Bulovic et al. |
| 2014/0084266 A1 | 3/2014 | Yang et al. |
| 2014/0176397 A1 | 6/2014 | Zhao et al. |
| 2017/0183095 A1 | 6/2017 | Liu et al. |
| 2017/0352321 A1 | 12/2017 | Hodges et al. |
| 2018/0003966 A1 | 1/2018 | Kilcher et al. |

CONTROL OF ELECTROCHROMIC PIXELS USING INTEGRATED TRANSPARENT PHOTOVOLTAIC CONVERTERS AND PROJECTED LIGHT FOR A TRANSPARENT WINDOW DISPLAY

BACKGROUND

Various content is displayed in vehicles for viewing by occupants of the vehicle. One such display technique involves using a head up display (HUD). Conventional HUDs involve the use of a projector that emits visible light and creates a perceptible image by reflecting the light off the vehicle windscreen or separate combiner and to the eyes of an occupant, wherein the displayed content appears to be presented "on" the windscreen or combiner.

Displaying content on the windscreen of a vehicle using a conventional HUD has many advantages over more traditional in cabin head down displays, including the possibility of using a larger area for displaying content, the content is displayed on the windscreen and therefore a driver does not need to divert their eyes as far from the road in order to see the content, and augmented reality applications are possible wherein the content is displayed in conjunction with the real time surroundings of the environment.

However, because light projected from a HUD is reflected off the windscreen, projector-based HUDs have a small field-of-view because the images distort when viewed at greater reflection angles, e.g. when viewed by a passenger rather than a driver of the vehicle. This distortion of the image at greater viewing angles means that the projected image may be discernable to only a single vehicle occupant (e.g. the driver), and therefore may not be useful for very large window-filling displays and may need to be projected on only a small portion of the vehicle window.

Traditional HUDs also struggle to meet the necessary luminance contrast for visibility when implemented in bright conditions (i.e. daylight) because they rely on the transmission and reflection of visible light from the projector, which can be diluted by daylight coming from outside the vehicle. In this regard, a conventional HUD has no way to produce dark graphics that could better contrast against a sunlit background. Additionally, the reflected image produced by traditional HUDs is only visible from an interior of the vehicle and are not visible at the exterior of the vehicle. These limitations have prevented projector-based HUDs from becoming the primary displays within vehicles.

Thus, there is a desire for improved technologies which can display content on the windows of a vehicle without the drawbacks associated with conventional projector-based HUDs.

BRIEF DESCRIPTION

According to one aspect, a window assembly comprises a transparent base layer; a plurality of electrochromic pixels arranged on the base layer, and a plurality of transparent photovoltaic converters. The electrochromic pixels are switchable between an inactive state and an active state. Each transparent photovoltaic converter is electrically connected to one or more of the electrochromic pixels. Each transparent photovoltaic converter can produce an electric current when irradiated with ultraviolet or infrared radiation to switch one or more of the electrochromic pixels from the inactive state to the active state to form one or more indicia on the window assembly.

According to another aspect, a window assembly comprises a transparent base layer, electrochromic pixels arranged on the base layer and switchable between having a transparent appearance and having an opaque appearance, and transparent photovoltaic converters. Each of the electrochromic pixels is electrically connected to only one of the photovoltaic converters. When one or more of the photovoltaic converters are irradiated with ultraviolet or infrared radiation, the irradiated photovoltaic converters produce an electric current that is transmitted to corresponding pixels that are electrically connected with the irradiated photovoltaic converters. When the electric current exceeds a threshold voltage, the corresponding pixels are actuated to switch between having the transparent appearance and having the opaque appearance. There is visual contrast between the opaque appearance and the transparent appearance.

According to another aspect, a vehicle heads up display system comprises an ultraviolet or infrared light source; and a vehicle window assembly. The vehicle window assembly includes a transparent base layer, a plurality of electrochromic pixels arranged on the base layer, and a plurality of transparent photovoltaic converters. The electrochromic pixels are switchable between an inactive state and an active state, and the plurality of transparent photovoltaic converters are electrically connected to the electrochromic pixels. Each transparent photovoltaic converter can produce an electric current when irradiated with the ultraviolet or infrared light source to switch one or more electrochromic pixels from the inactive state to the active state to form one or more indicia on the window assembly.

According to another aspect, a vehicle heads up display system includes an ultraviolet or infrared light source; and a vehicle window assembly including a transparent base layer, electrochromic pixels arranged on the base layer and switchable between having a transparent appearance and having an opaque appearance, and transparent photovoltaic converters each of which is electrically connected to only one of the electrochromic pixels. When the photovoltaic converters are irradiated with ultraviolet or infrared radiation from the light source, the irradiated photovoltaic converters produce electric current that is transmitted to corresponding pixels in electrical connection with the irradiated photovoltaic converters, and if the electric current exceeds a threshold voltage, then the corresponding pixels are actuated to switch between having a transparent appearance and having an opaque appearance. Indicia is produced by visual contrast between pixels having the opaque appearance and pixels having the transparent appearance. The indicia is maintained unless the pixels are supplied with electric current that exceeds the threshold voltage.

According to another aspect, a method of displaying indicia on a window assembly comprises providing an ultraviolet or infrared light source and providing a window assembly including a transparent base layer, a plurality of electrochromic pixels arranged on the base layer that are selectively switchable between an inactive state and an active state, and transparent photovoltaic converters each of which is electrically connected to one or more of the electrochromic pixels. The method also includes irradiating predetermined photovoltaic converters with ultraviolet or infrared radiation emitted from the light source to switch the electrochromic pixels that are electrically connected to the irradiated photovoltaic converters from the inactive state to the active state or from the active state to the inactive state to form one or more indicia on the window assembly.

According to another aspect, a method of displaying indicia on a window assembly comprises providing an ultraviolet or infrared light source and a window assembly. The window assembly includes a transparent base layer, electrochromic pixels arranged on the base layer and switchable between having a transparent appearance and having an opaque appearance, and transparent photovoltaic converters each of which is electrically connected to only one of the electrochromic pixels. Predetermined photovoltaic converters are irradiated with ultraviolet or infrared radiation emitted from the light source to thereby produce indicia on the window assembly. The irradiated photovoltaic converters produce electric current that is transmitted to corresponding pixels that are electrically connected to the irradiated photovoltaic converters. When the electric current exceeds a threshold voltage, the corresponding pixels switch between having the transparent appearance to having the opaque appearance and thereby produce indicia on the window assembly.

DETAILED DESCRIPTION

Figure 1:
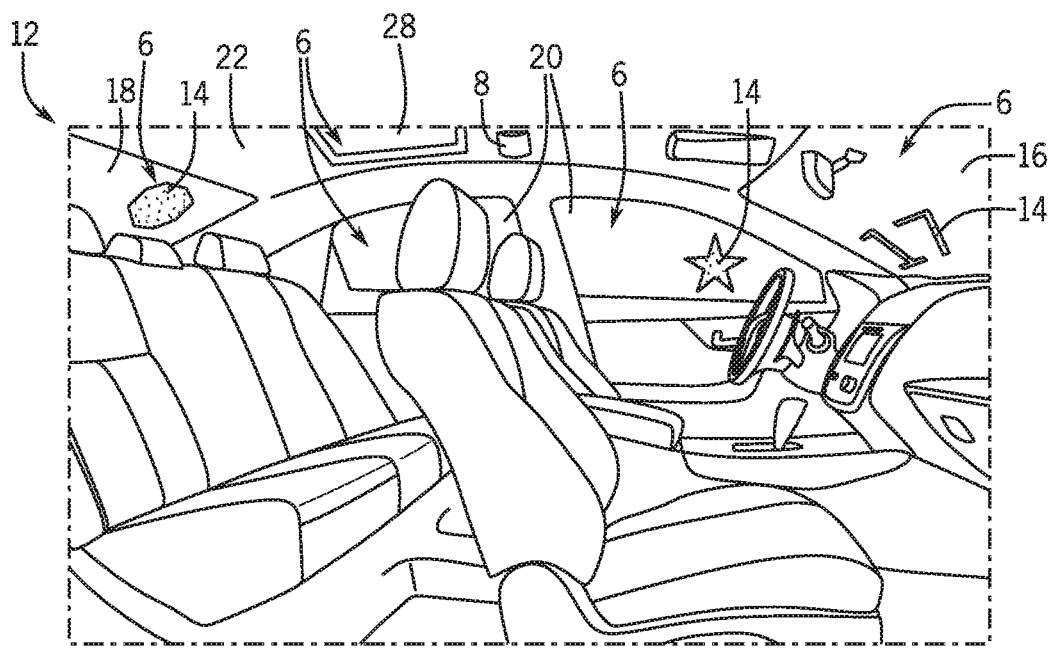
FIG. 1 is a side view of an interior of a vehicle including the head up display system in accordance with the present subject matter.

Referring now to FIGS. 1-4, a vehicle head up display (HUD) system 2 includes a window assembly 4 that may be used as a head up display 6 in a vehicle 12. The system 2 also includes an ultraviolet (UV) or infrared (IR) light source 8 for actuating the HUD 6, and may additionally include an electronic control unit (ECU) 10 in communication with the light source 8 for controlling operation of the light source 8.

The system 2 may be incorporated into the vehicle 12 to provide indicia 14 displayed by the HUD 6 for viewing by occupants of the vehicle 12. The window assembly 4 can be used for, or incorporated into any window in the vehicle 12, including the front windscreen 16, back window 18, side windows 20, or windows incorporated in the roof 22 of the vehicle 12, for example a moon roof 28, in order to allow the presentation of indicia on these surfaces.

The window assembly 4 includes a transparent base layer 24, an array of electrochromic pixels 26, and an array of transparent photovoltaic converters 30. As used herein, "transparent" and cognate terms means that visible light passes through a material to allow for image formation through the material. Image formation through transparent material is possible because the visible light is not significantly scattered by the material. As used herein, "opaque" and cognate terms means that no visible light passes through a material, but also includes translucency, which is where some visible light passes through a material but with significant scattering of light such that image formation is not possible. An opaque appearance presents darker and/or hazier than a transparent appearance, and the opaque appearance may present one or more colors.

The transparent base layer 24 comprises a transparent material, for example, glass, a polymer material, transparent ceramics, or combinations, composites, or laminates thereof. The transparent base layer 24 may be, or be incorporated into, one or more layers of automotive glass (i.e. laminated safety glass) such as a front windscreen 16, side windows 20, a back window 18, and transparent panels (e.g. moon roof 28) on the roof 22 of the vehicle 12. The base layer 24 provides a structure for supporting the other components of the window assembly 4, and for mounting the window assembly 4 in the vehicle 12 as part of a HUD 6.

Figure 2:
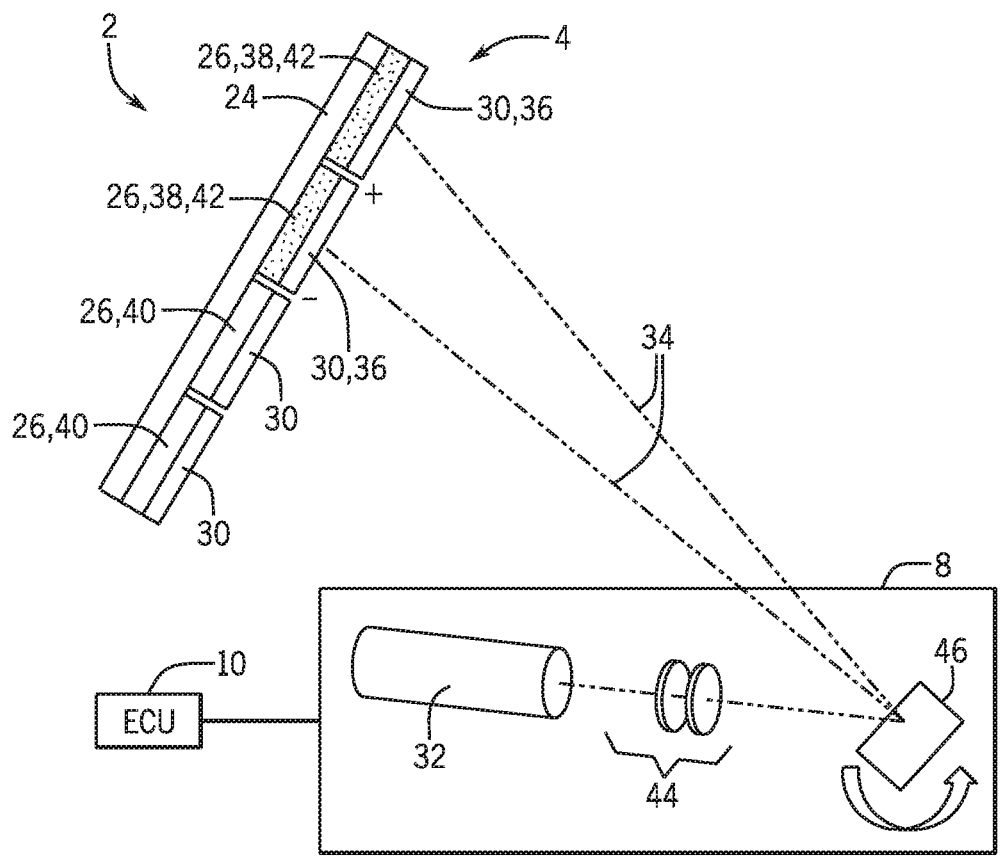
FIG. 2 is a schematic view of a head up display system in operation in accordance with the present subject matter.
Figure 3:
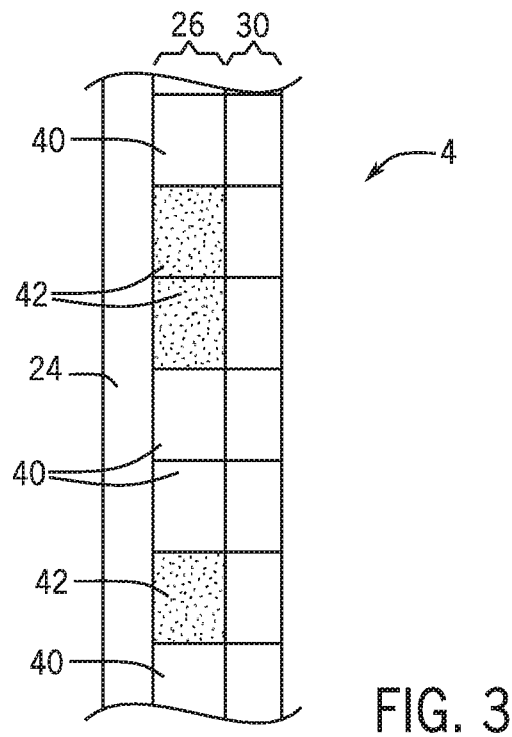
FIG. 3 is a schematic cross-sectional view of a window assembly in accordance with the present subject matter.
Figure 4:
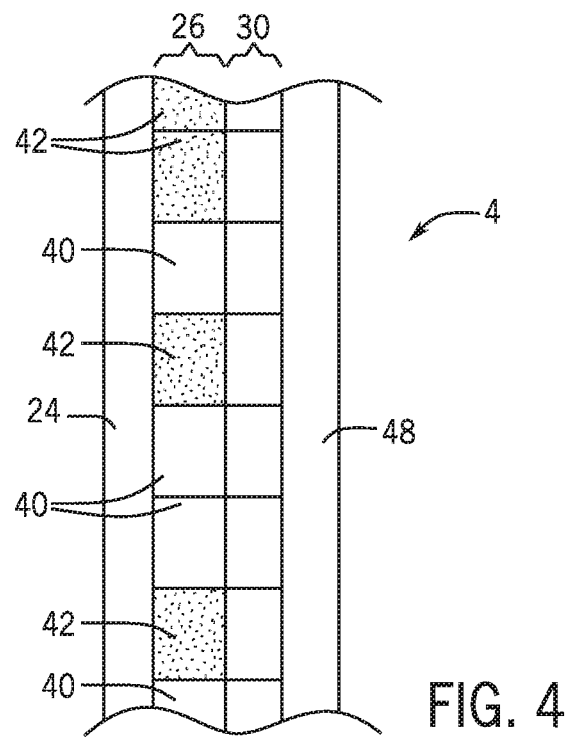
FIG. 4 is a schematic cross-sectional view of another window assembly in accordance with the present subject matter.

The plurality of electrochromic pixels 26 may be arranged on the base layer 24, for example, contacting the base layer 24 as depicted in FIGS. 2-4. However, this configuration is not required and one or more other transparent layers or material may be interposed between the base layer 24 and the electrochromic pixels 26. The electrochromic pixels 26 may each be in the form of a square or other shape, and may be configured in a regular pattern, such as a two-dimensional grid, to form an array on the base layer 24. The area of each of the pixels 26 is not particularly limited and can vary or be consistent among the pixels 26, and can range from about 0.01 to 1.0 cm$^2$, or more or less as desired, such as up to 10 cm$^2$ or down to 0.001 cm$^2$. The array of electrochromic pixels 26 can cover a portion, or all of the base layer 24 or one or more vehicle windows 16, 18, 20, 28 as desired. In one non-limiting embodiment, a HUD 6 is included in the windscreen 16, in the side windows 20, in the back window 18, and in the moon roof 28. In another non-limiting embodiment, the electrochromic pixels 26 each cover an area of 0.1-0.5 cm$^2$ and cover the entire portion of a vehicle window 16, 18, 20, 28 that is visible to occupants of the vehicle 12.

The electrochromic pixels 26 each may comprise a transparent electrochromic device, e.g. a transparent electrochemical cell. The transparent electrochemical cell typically includes an electrochromic material as a transparent first electrode, which is separated by a transparent solid or liquid electrolyte from a charge-balancing ion-generating counter electrode that is also transparent. Switching between having the transparent appearance and the opaque appearance is possible because the pixels 26 include the electrochromic material, which switches between being transparent and opaque upon application of electric current that exceeds a threshold voltage. The electrochromic material is switchable between an inactive state and an active state by charging and discharging the electrochemical cell with an electric current. In one embodiment, the inactive state includes the electrochromic pixels having a transparent appearance, and the active state includes the electrochromic pixels having an opaque appearance and there is a visual contrast between the transparent appearance and the opaque appearance. In one embodiment, the electrochromic material switches from the inactive state (i.e. transparent) to the active state (opaque), or vice versa, when supplied with an electric current that exceeds a threshold voltage. The threshold voltage is determined at least in part by the type of electrochromic material used in the electrochromic pixels 26. When electrical current (e.g. electric current that exceeds the threshold voltage) is applied, ions flow to the electrochromic substance, which switches from transparent to opaque (or vice versa). When the electric current is discontinued, the electrochromic material maintains the state that it was in (either active state or inactive state) at the moment the electric current was discontinued. When an electric current with the reversed polarity (e.g. current exceeding the threshold voltage) is subsequently applied to the electrochemical cell, the ions move away from the opaque electrochromic material and the inactive state (i.e. transparency) is restored. Switching back and forth between the transparent appearance and the opaque appearance can continue with each application of electric current, e.g. with each application of electric current that exceeds the threshold voltage. The transparent and opaque appearances are maintained even after the electric current is removed. Suitable electrochromic materials may include, but are not limited to, transition metal oxides (e.g. tungsten trioxide), Prussian blue, phthalocyanines, viologens, fullerenes, dyes, conducting polymers (including gels), and metal with a naphthalene diimide salicylic acid (NDISA) ligand, which has a chemical formula of $(C_{28}H_{10}N_2O_{10})(H_2O)_2$. In one non-limiting embodiment, the electrochromic material in the pixels 26 include magnesium or nickel with naphthalene diimide salicylic acid ligand, e.g. Mg-NDISA $[Mg_2(C_{28}H_{10}N_2O_{10})(H_2O)_2]$ and Ni-NDISA $[Ni_2(C_{28}H_{10}N_2O_{10})(H_2O)_2]$. These materials may be applied as thin films for producing the pixels 26.

The plurality of photovoltaic converters 30 may be arranged on the electrochromic pixels 26, for example, in contact with and directly overlying the electrochromic pixels 26 as depicted in the figures. However, this configuration is not required and one or more other layers or material may be interposed between the electrochromic pixels 26 and the photovoltaic converters 30, or the photovoltaic converters 30 may be arranged elsewhere in relation to the electrochromic pixels 26, such as at a different location of the window assembly or on a different window. In a non-limiting example, the photovoltaic converters 30 may be arranged on one portion of the window assembly 4 and the electrochromic pixels 26 with which they are electrically connected may be arranged on a different portion of the window assembly 4. The photovoltaic converters 30 are transparent to visible light, which passes through the photovoltaic converters 30 and allows for image formation therethrough. This makes the photovoltaic converters 30 useful for incorporating into the window assembly 4 for use in vehicle windows 16, 18, 20, 28. Transparent, lightweight, and flexible photovoltaic converters 30 can be manufactured using thin graphene-based electrodes or other transparent electrodes. These photovoltaic converters 30 can be constructed such that they transmit electromagnetic radiation in the visible light spectrum (i.e. visible light), but absorb UV and/or IR electromagnetic radiation to produce an electric current. This feature allows the photovoltaic converters 30 to produce energy while still being transparent.

In one non-limiting embodiment, the transparent photovoltaic converters 30 are electrically connected to and directly overlaying the pixels 26 in a one-to-one manner, wherein each photovoltaic converter 30 is electrically connected to only one pixel 26, and vice versa. However, in other embodiments, more than one pixel 26 may be connected to each photovoltaic converter 30 or more than one photovoltaic converter 30 may be connected to each pixel 26. In one embodiment, adjacent pixels have different electrochromic material and therefore display different colors when actuated to have the opaque appearance. The different colors of the adjacent pixels can be used to produce single- or multi-colored indicia, much like images produced in a television from yellow, cyan, and magenta pixels.

The photovoltaic converters 30 are electrically connected to the electrochromic pixels 26, and produce electric current when irradiated with UV or IR radiation. The electric current that is generated by the photovoltaic converters 30 is transmitted to the pixels 26. Upon each application of electric current (e.g. electric current that exceeds the threshold voltage), the pixels 26 are actuated to switch from the inactive state (i.e. having the transparent appearance) to the active state (i.e. having the opaque appearance), or from active state to the inactive state. In a non-limiting example, the pixels 26 maintain the transparent appearance or the opaque appearance without requiring a constant supply of electric current, and until another electric current that exceeds the threshold voltage is subsequently applied to the pixels 26.

Selective actuation of the electrochromic pixels 26 in the HUD 6 to switch their appearance between opaque and transparent may be achieved using UV or IR radiation 34 emitted from the UV or IR light source 8. The radiation 34 is directed at predetermined photovoltaic converters 30, which generate an electric current when irradiated with the UV or IR radiation 34. The UV or IR radiation 34 has sufficient power, such that the electric current generated by the irradiated photovoltaic converters 36 is above the threshold voltage. This produced electric current, which is above the threshold voltage, is transmitted to corresponding pixels 38 that are electrically connected to the irradiated photovoltaic converters 36. When subject to the electric current that exceeds the threshold voltage, the corresponding pixels 38 switch from being transparent to being opaque, or vice versa.

The light source 8 may be separate from the display 6, and may include a UV or IR laser 32, optical lenses 44, and a scanning mirror 46, or may include a UV or IR projector (not shown). In a non-limiting embodiment, the UV or IR light source 8 is arranged on the roof of the vehicle 12. At this location, the light source 8 may be able to direct radiation 34 directly to multiple HUDs 6 located in the front windscreen 16, back window 18, side windows 20, and moon roof 28. The light source 8, or an additional UV or IR light source, may be arranged at other locations on the vehicle 12, including in the front dashboard, center console, head rest, or at the exterior of the vehicle 12.

In embodiments incorporating the use of a laser 32 and as shown in FIG. 2, UV or IR radiation 34 emitted from the laser 32 is selectively directed to one or more photovoltaic converters 30 as desired, causing the irradiated photovoltaic converters 36 to generate an electric current, which is transmitted to the corresponding pixels 38 in electrical connection with the irradiated photovoltaic converter 36. If the electric current exceeds a threshold voltage, then the corresponding pixels 38 receiving such current are actuated to switch between having the transparent appearance and having the opaque appearance. Visual contrast between the transparent appearance and the opaque appearance produce visible indicia 14 displayed on the HUD 6. In other words, transparent pixels 40 allow background light and images from the environment to be transmitted through the HUD 6, while opaque pixels 42 impede such transmission of light and image formation. In this way, the opaque pixels 42 are visually discernable from and contrast with the transparent pixels 40, and can be used to create indicia 14 on the HUD 6.

The radiation 34 emitted by the laser 32 may be controlled by the ECU 10 in order to "draw out" indicia 14 onto the display 6. In application, such drawing out of indicia 14 may occur so quickly, such that the actuation of multiple pixels 26 in the HUD 6 appears to be simultaneous. In other aspects, such drawing out of indicia 14 may occur relatively slowly, such that the actuation of multiple pixels 26 does not appear to be simultaneous, but sequential actuation of pixels 26 is observable by occupants of the vehicle 12. In another embodiment, more than one laser can be used, a width of the beam of laser radiation 34 may be adjusted, or the laser radiation 34 can be split into several separately controllable beams in order to simultaneously actuate a plurality of pixels 26. The laser radiation 34 emitted by the UV or IR laser 32 may be directed by physical movement of the laser 32 using motors, or may be directed or modified by the controlled deflection of the laser radiation 34 using optical lenses 44, beam splitters, scanning mirrors 46, acousto-optic deflectors, electro-optic deflectors, phased arrays, or combinations thereof. In embodiments incorporating the use of a projector, the principles of operation may be similar, wherein radiation emitted by the projector actuates the pixels 26, and a single projector or multiple projectors may be used to emit radiation that simultaneously or sequentially actuates a plurality of pixels 26.

The electrochromic pixels 26 may be normally transparent, so that occupants of the vehicle 12 can see through the window assembly 4 and HUD 6 to view the environment outside the vehicle 12. Thus, the pixels 26 and transparent photovoltaic converters 30 could be integrated on the transparent base layer 24 for use in a normally transparent HUD 6. The HUD 6 can then display visible indicia 14 by the selective actuation of certain pixels 26 to switch from having the transparent appearance to having the opaque appearance. Reversion of the pixels 26 from being opaque to being normally transparent may happen without additional input from a vehicle occupant and may occur after a predetermined amount of time.

The use of pixels 26 that include electrochromic material, allows the HUD 6 to statically display indicia 14 without requiring a constant supply of electric power to the pixels 26. This is because the electrochromic pixels 26 remain in their current state (i.e. either transparent or opaque) until another electric current exceeding the threshold voltage is subsequently applied. This behavior reduces the need for supplying a continuous power source to statically displayed indicia 14 on the HUD 6, and allows the static display of indicia 14 even when no power is supplied to the HUD 6, for example when the associated vehicle 12 is powered off and not running. Such static indicia 14 may include for example, a logo on the windscreen 16 when the vehicle 12 is not operational and parked. As indicated, the indicia 14 are visible through the visual contrast created between the transparent pixels 40 and the opaque pixels 42. In this way the indicia 14 are visible in bright conditions (i.e. daytime), wherein the light from the exterior of the vehicle 12 presents a bright contrasting background to the darker opaque pixels 42. In one embodiment, the indicia 14 is also be visible from an exterior of the vehicle 12.

Because the HUD 6 does not rely on projected and reflected light to create an image like conventional projected-based HUDs, the HUD 6 provides for wider viewing angles with improved visibility by all vehicle passengers compared to conventional projector-based HUDs. This wider viewing angle is possible because there is no distortion of images at increased reflection angles like in conventional projector-based HUDs, wherein projected light from a conventional projector-based HUD must reflect light off the vehicle window at exactly the correct angle so that the reflected light is directed towards the eyes of an occupant with no distortion. At increased reflection angles in conventional projector-based HUDs, there is significant distortion of the indicia when viewed by a passenger of the vehicle as opposed to a driver of the vehicle. With the instant HUD 6 however, the laser radiation 34 or projected UV or IR radiation is not directly used as an image, but is simply used to actuate the electrochromic pixels 26 on the HUD 6, which collectively form the indicia 14 by the visible contrast created between the transparent pixels 40 and the opaque pixels 42. Once actuated, the opaque electrochromic pixels 42 are directly visible from any angle without distortion from reflection. This mechanism of display allows for use of a larger display area than is normally used with a conventional projector-based HUD. Additionally, the indicia 14 are potentially visible even from outside the vehicle 12. In one embodiment, the indicia can be used to communicate with people outside the vehicle, such as passengers in nearby vehicles or pedestrians, wherein letters, words, symbols, or the like may be displayed for viewing by those outside the vehicle 12.

The indicia 14 displayed on the HUD 6 is not particularly limited, and can present information relating to one or more operations or performance characteristics of the vehicle 12, such as a current speed of the vehicle 12, navigation or driving instructions (including warnings), fluid levels, engine performance, or the like; or may present information, entertainment, or interactive platforms including television broadcasts, videos, movies, video games, augmented reality, pictures (including logos or symbols), interactive activities, communication platforms (including internet access, text messages, emails, etc.), and the like. For this purpose, the HUD system 2 may be paired with a mobile device, such as a mobile phone, or may be connected to the internet.

In one embodiment, the window assembly 4 is incorporated into the front windscreen 16 of a vehicle 12 and used as a HUD 6 to display indicia 14 to a driver of the vehicle 12. In this embodiment, the indicia 14 present information relating to the operations or performance characteristics of the vehicle 12. It will be understood that although the indicia is intended for the driver, the indicia 14 is visible to other occupants of the vehicle 12. In another embodiment, the window assembly 4 is used to display entertainment content to occupants of the vehicle. In autonomous vehicles, this type of display can even include use of the entire front windscreen 16. In one embodiment, certain or all pixels 26 in the HUD 6 may be actuated to be opaque and not to produce indicia 14 that present information to occupants of the vehicle 12, but are actuated to reduce light entering into the passenger compartment through one or more windows 16, 18, 20, 28 or portions thereof (such as blocking sunlight from directly shining in the eyes of a vehicle occupant), or to reduce visibility into the passenger compartment from outside the vehicle 12 so as to deter people from seeing inside the vehicle 12, such as when it is unattended.

After one or more pixels 26 are actuated to have the opaque appearance and to provide indicia 14 on the HUD 6, such indicia 14 may eventually need to be removed in order to allow for unobstructed viewing through the vehicle window 16, 18, 20, 28 or in order to allow for subsequent indicia to be displayed on the HUD 6. In one embodiment, indicia 14 displayed by the HUD 6 is removed by actuating the opaque pixels 42 to switch to be transparent pixels 40. The opaque pixels 42 are actuated to have the transparent appearance by subjecting them to an electric current that exceeds the threshold voltage. This electric current that exceeds the threshold voltage may be supplied in one embodiment, by directing radiation from the UV or IR light source 8 at the corresponding photovoltaic converters 30 that are electrically connected to the opaque pixels 42. The photovoltaic converters 30 that are irradiated with the radiation 34 produce an electric current that is over the threshold voltage, which is transmitted to the opaque pixels 42 to thereby actuate the opaque pixels 42 to switch to have the transparent appearance and thus removing the indicia 14 form the HUD 6. In removing the indicia 14, the UV or IR radiation 34 may be directed along the same or similar path and actuate the same pixels 26 as when initially forming the indicia 14. In one embodiment, the ECU 10 that controls the laser 32 keeps track of which pixels 26 are opaque or transparent based on the history of movement of the laser 32 or laser radiation 34. In another embodiment, a camera based tracking system communicating with the ECU 10 may be used to directly monitor the HUD 6 using image recognition to track which pixels 26 are opaque versus which pixels 26 are transparent.

In one embodiment as shown in FIG. 4, the window assembly 4 may include a transparent protective layer 48 covering a surface of the window assembly 4. The protective layer 48 may be included to protect the components of the window assembly 4 from degradation from exposure to the environment, such as abrasion, humidity, heat, or other factors. The transparent protective layer 48 may include the same or similar material as the base layer 24, such as glass, polymer, transparent ceramics, or the like. In one non-limiting example, the protective layer 48 may comprise the inside glass layer of laminated vehicle safety glass, while the base layer 24 may be the outside glass layer of laminated vehicle safety glass. Other materials and layers may be used for the window assembly 4 and HUD 6 as desired including various adhesive layers.

In one embodiment, electrical current may be generated by the photovoltaic converters 30 when exposed to UV or IR radiation from sunlight. This electrical current does not exceed the threshold voltage and therefore does not actuate the pixels 26 to switch from having the transparent appearance to having the opaque appearance. However, this electrical current, which is under the threshold voltage, may be harvested and stored in a vehicle battery for later use, for example to power the UV or IR light source 8.

In one embodiment, the HUD 6 includes, not only the UV or IR light source 8, but additionally includes a visible light projector that operates like a conventional projector-based HUD by emitting visible light that is reflected off a vehicle window and presents as lighted indicia to the eyes of a vehicle occupant. This combination of components is useful so that in well-lit conditions, e.g. daytime, the UV or IR light source 8 can be used to actuate the pixels 26 in order to provide a dark indicia 14 on the HUD 6 that contrasts against the lighted background of the external daytime environment. However, in dim conditions, e.g. nighttime, the visible light projector can be used to project visible light to reflect off a vehicle window to produce lighted indicia that contrasts against the dark background of the external nighttime environment. The dark opaque pixels 42 are more visible in well-lit conditions than visible light emitted from the visible light projector, and the visible light emitted by the visible light projector may be more visible than the dark opaque pixels 42 in dark conditions. In one aspect of this embodiment, the HUD 6 may include a projector capable of emitting UV or IR light for actuating the electrochromic pixels 26, and also capable of emitting visible light for creating projector-based lighted indicia reflected off the vehicle window.

A method of displaying indicia 14 on a window assembly 4 includes providing a UV or IR light source 8 and a window assembly 4 as described herein. The window assembly 4 may be part of a HUD 6 in a vehicle 12. The HUD 6 may be incorporated into any window 16, 18, 20, 28 of the vehicle 12. The method includes irradiating certain predetermined photovoltaic converters 30 in the window assembly 4 with UV or IR radiation 34 that is emitted by the light source 8. The light source 8 may include a UV or IR laser 32. The ECU 10, another vehicle computer or control unit, a computer program, or instructions from an external computer may be used to predetermine which photovoltaic converters 30 are irradiated with UV or IR radiation 34. Such predetermining may depend, at least in part, on the indicia 14 intended to be displayed. For example, if the current speed of the vehicle 12 is intended to be displayed, then the ECU 10 controls the light source 8, such that radiation 34 emitted by the light source 8 is directed to those photovoltaic converters 30 that produce indicia 14 showing the current speed in the corresponding pixels 38 of the HUD 6.

The irradiated photovoltaic converters 36 produce electric current exceeding the threshold voltage, which is transmitted to the corresponding pixels 38 that are electrically connected to the irradiated photovoltaic converters 36. Such electric current actuates transparent pixels 40 to become opaque pixels 42, and/or actuates opaque pixels 42 to become transparent pixels 40. Visual contrast between the transparent pixels 40 and the opaque pixels 42 produce visual indicia 14 on the HUD 6, which is maintained until the pixels 26 are again supplied with electric current that exceeds the threshold voltage.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A window assembly comprising:
a transparent base layer,
a plurality of electrochromic pixels arranged on the base layer, the electrochromic pixels are switchable between an inactive state and an active state, and
a plurality of transparent photovoltaic converters, each transparent photovoltaic converter is electrically connected to one or more of the electrochromic pixels, each transparent photovoltaic converter can produce an electric current when irradiated with ultraviolet or infrared radiation to switch one or more of the electrochromic pixels electrically connected to the irradiated photovoltaic converters from the inactive state to the active state to form one or more indicia on the window assembly,
wherein UV or IR radiation from sunlight does not cause the electrochromic pixels to switch between the active state and the inactive state.

2. The window assembly according to claim 1, wherein:
the electrochromic pixels switch between the active state and the inactive state when the electric current exceeds a threshold voltage,
the UV or IR radiation from sunlight does not cause the photovoltaic converters to produce electric current that exceeds the threshold voltage, and
the electrochromic pixels maintain the active state or the inactive state unless the electrochromic pixels are supplied with electric current that exceeds the threshold voltage.

3. The window assembly according to claim 2, wherein when pixels in the inactive state are supplied with the electric current that is produced by the irradiated photovoltaic converters and that exceeds the threshold voltage, the pixels in the inactive state switch to the active state.

4. The window assembly according to claim 3, wherein when pixels in the active state are supplied with electric current that exceeds the threshold voltage, the pixels in the active state are actuated to be in the inactive state.

5. The window assembly according to claim 1, wherein:
the inactive state comprises the electrochromic pixels having a transparent appearance,
the active state comprises the electrochromic pixels having an opaque appearance,
the visual contrast between the opaque appearance and the transparent appearance is visible on two sides of the window assembly.

6. The window assembly according to claim 1, wherein each of the electrochromic pixels is electrically connected to only one of the photovoltaic converters.

7. A vehicle heads up display system comprising:
an ultraviolet or infrared light source; and
a vehicle window assembly including
a transparent base layer,
a plurality of electrochromic pixels arranged on the base layer, the electrochromic pixels are switchable between an inactive state and an active state, and
a plurality of transparent photovoltaic converters that are electrically connected to the electrochromic pixels, each transparent photovoltaic converter can produce an electric current when irradiated with the ultraviolet or infrared light source to switch one or more electrochromic pixels electrically connected to the irradiated photovoltaic converters from the inactive state to the active state to form one or more indicia on the window assembly.

8. The system according to claim 7, wherein the light source includes an infrared or ultraviolet laser.

9. The system according to claim 8, wherein the light source includes one selected from the group consisting of motors, optical lenses, beam splitters, scanning mirrors, acousto-optic deflectors, electro-optic deflectors, phased arrays, and combinations thereof.

10. The system according to claim 7, further comprising an electronic control unit that controls operation of the light source to selectively irradiate the pixels.

11. The system according to claim 7, wherein when pixels having the transparent appearance are supplied with electric current that exceeds a threshold voltage, the pixels in the inactive state are switched to the active state.

12. The system according to claim 11, wherein when pixels in the active state are supplied with electric current that exceeds the threshold voltage, the pixels in the active state are switched to the inactive state.

13. The system according to claim 12, wherein the indicia is maintained unless the electrochromic pixels are supplied with electric current that exceeds the threshold voltage.

14. A method of displaying indicia on a window assembly comprising:
providing an ultraviolet or infrared light source,
providing a window assembly including a transparent base layer, a plurality of electrochromic pixels arranged on the base layer that are selectively switchable between an inactive state and an active state, and transparent photovoltaic converters each of which is electrically connected to one or more of the electrochromic pixels; and
selectively irradiating only predetermined ones of the photovoltaic converters with ultraviolet or infrared radiation emitted from the light source to switch only those electrochromic pixels that are electrically connected to the irradiated photovoltaic converters from the inactive state to the active state to form one or more indicia on the window assembly.

15. The method according to claim 14, wherein:
the electrochromic pixels in the inactive state have a transparent appearance, and
the electrochromic pixels in the active state have an opaque appearance.

16. The method according to claim 15, further including the step of removing the indicia from the window assembly by transmitting electric current to pixels having the opaque appearance to thereby actuate the pixels having the opaque appearance to have the transparent appearance.

17. The method according to claim 16, wherein removing indicia from the window assembly includes irradiating photovoltaic converters that are electrically connected to the pixels having the opaque appearance with ultraviolet or infrared light emitted from the light source.

18. The method according to claim 14, wherein the light source includes an infrared or ultraviolet laser and one selected from the group consisting of motors, optical lenses, beam splitters, scanning mirrors, acousto-optic deflectors, electro-optic deflectors, phased arrays, and combinations thereof.

19. The method according to claim 14, wherein the indicia is visible on two sides of the window assembly.

20. The method according to claim 14, wherein the window assembly is part of a heads up display in a vehicle and the indicia communicates information relating to one or more operations or performance characteristics of the vehicle.

* * * * *